United States Patent
Okumura et al.

(10) Patent No.: US 9,180,880 B2
(45) Date of Patent: Nov. 10, 2015

(54) DRIVING FORCE CONTROL SYSTEM FOR VEHICLE

(75) Inventors: Kazuya Okumura, Mishima (JP); Souichirou Shimura, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 220 days.

(21) Appl. No.: 14/008,747

(22) PCT Filed: Mar. 30, 2011

(86) PCT No.: PCT/JP2011/058109
§ 371 (c)(1),
(2), (4) Date: Sep. 30, 2013

(87) PCT Pub. No.: WO2012/131952
PCT Pub. Date: Oct. 4, 2012

(65) Prior Publication Data
US 2014/0019007 A1 Jan. 16, 2014

(51) Int. Cl.
*B60W 30/045* (2012.01)
*B60W 30/02* (2012.01)

(52) U.S. Cl.
CPC ............ *B60W 30/045* (2013.01); *B60W 30/02* (2013.01); *B60W 30/025* (2013.01); *B60W 2520/14* (2013.01); *B60W 2540/18* (2013.01)

(58) Field of Classification Search
CPC . B60W 30/02; B60W 30/025; B60W 30/045; B60W 2520/14; B60W 2540/18
See application file for complete search history.

(56) References Cited

U.S. PATENT DOCUMENTS

| | | | |
|---|---|---|---|
| 5,774,821 A * | 6/1998 | Eckert | 701/78 |
| 6,470,250 B2 * | 10/2002 | Nishizaki et al. | 701/48 |
| 6,708,088 B2 * | 3/2004 | Matsuno et al. | 701/1 |

(Continued)

FOREIGN PATENT DOCUMENTS

| | | |
|---|---|---|
| JP | 2004-149107 A | 5/2004 |
| JP | 2005 256636 | 9/2005 |

(Continued)

OTHER PUBLICATIONS

International Search Report Issued May 24, 2011 in PCT/JP11/058109 Filed Mar. 30, 2011.

*Primary Examiner* — Helal A Algahaim
*Assistant Examiner* — Kelly D Williams
(74) *Attorney, Agent, or Firm* — Oblon, McClelland, Maier & Neustadt, L.L.P.

(57) ABSTRACT

A driving force control system for a vehicle, which is configured to control a driving force of a vehicle by calculating an actual value of a stability factor of a running vehicle based on a detection value of a predetermined sensor, and adjusting the calculated actual value of the stability factor toward a target value of the stability factor determined depending on a travelling condition of the vehicle. The driving force control system is comprised of: a steering judging unit that judges a fact that a change rate of a steering angle of the vehicle is smaller than a predetermined reference value; a correction value calculating unit that corrects the actual value of the stability factor based on a comparison between an actual value and a target value of a physical amount with respect to a turning motion of the vehicle, in case the steering judging unit judges that the change rate of the steering angle is smaller than a reference value; and a driving force correcting unit that corrects the driving force based on the correction value.

2 Claims, 6 Drawing Sheets

(56) References Cited

U.S. PATENT DOCUMENTS

| | | | |
|---|---|---|---|
| 7,584,042 B2 * | 9/2009 | Suzumura et al. | 701/70 |
| 2002/0153770 A1 * | 10/2002 | Matsuno et al. | 303/146 |
| 2005/0149243 A1 * | 7/2005 | Ghoneim | 701/48 |
| 2005/0200088 A1 | 9/2005 | Sawada et al. | |
| 2006/0169522 A1 | 8/2006 | Katayama | |
| 2012/0316744 A1 * | 12/2012 | Shimura et al. | 701/72 |

FOREIGN PATENT DOCUMENTS

| | | |
|---|---|---|
| JP | 2006 27388 | 2/2006 |
| JP | 2008 275344 | 11/2008 |

* cited by examiner

DRIVING FORCE CONTROL SYSTEM FOR VEHICLE

TECHNICAL FIELD

This invention relates to a system for controlling a vehicle behavior such as a cornering performance, and especially to a system for controlling a driving force in a manner to correct a stability factor having a significant effect on the vehicle behavior to achieve a target stability factor.

BACKGROUND ART

A stability factor is one of the significant factors affecting the vehicle behavior. Provided that the vehicle is turning steadily without accelerating and decelerating, the stability factor can be expressed using an inertial mass, a wheel base, cornering powers (i.e., cornering forces) of front and rear wheels, a distance between a gravity center of the vehicle and a front axle, a distance between the gravity center of the vehicle and a rear axle and etc. Otherwise, the stability factor can be obtained based on an actual steering angle, a wheel base, a lateral acceleration and a vehicle speed. Such formula may be modified to calculate the stability factor of the case in which the vehicle is turning while accelerating or decelerating. Specifically, the stability factor of this case may be calculated using a quadratic expression in which a term multiplying a longitudinal acceleration by a coefficient and a term multiplying the square of longitudinal acceleration by a coefficient are added to the stability factor of the case without acceleration and deceleration. To this end, specifically, the coefficient relating to compliance between a load shift resulting from acceleration or deceleration and a change in a toe angle, and a coefficient relating to a cornering characteristic of tires subjected to a driving force and a braking force, are used in the above-mentioned expression.

For example, a turning radius, and a yaw rate during turning are changed depending on a value of the stability factor. Thus, the stability factor is a major parameter (i.e., a physical quantity) having a great influence on the steering characteristics of automobiles. Basically, the stability factor is governed by a structure of the vehicle, characteristics of tires etc. However, cornering powers of front and rear wheels may be changed depending on loads applied to the front and rear wheels, deterioration of the wheels with age and so on. In addition, in the formula for calculating the stability factor thus modified, the coefficients used in the linear term and the quadratic term of the longitudinal acceleration may not always correspond to designed value.

Over the years, attempts have been made to correct the stability factor for the purpose of controlling vehicle behavior. For example, Japanese Patent Laid-Open No. 2005-256366 discloses a control system configured to stabilize vehicle body attitude by suppressing the effect of driver operation disturbance or road surface disturbance. The control system taught by Japanese Patent Laid-Open No. 2005-256366 have been conceived noting a fact that the stability factor fluctuates due to fluctuation of ground loads on the front and rear wheels. Therefore, the control system taught by Japanese Patent Laid-Open No. 2005-256366 is configured to correct an axle torque in a manner such that the difference between the products of front wheel and rear wheel cornering powers and distances between the center of gravity of the vehicle and each front and rear wheels (that is, moments derived from the cornering powers of the front and rear wheels) follow the target value.

Meanwhile, Japanese Patent Laid-Open No. 2008-275344 discloses a device for calibrating the zero point of a yaw rate sensor for detecting a yaw rate, that is, a turning condition of the vehicle. Specifically, the device taught by Japanese Patent Laid-Open No. 2008-275344 is configured to calibrate the zero point of the yaw rate sensor by detecting a turning condition of the vehicle using a sensor other than the yaw rate sensor, and comparing the detection value with a value detected by the yaw rate sensor.

That is, the control system taught by Japanese Patent Laid-Open No. 2005-256366 is configured to control the torque in a manner such that the actual stability factor follows the target value. For this purpose, the actual stability factor is obtained based on a detection value of the sensor for detecting a behavior of the vehicle such as the yaw rate sensor. However, if the detection value of the sensor has an accidental error, the stability factor will not represent the actual vehicle behavior. In this case, therefore, the torque may not be controlled properly to deteriorate a drive feeling.

As described, the device taught by Japanese Patent Laid-Open No. 2008-275344 is configured to calibrate the zero point of the yaw rate sensor so that an accidental error of the sensor value is reduced. However, according to the teachings of Japanese Patent Laid-Open No. 2008-275344, another sensor such as a radar is required to detect a turning condition of the vehicle in addition to the yaw rate sensor, and this complicates a structure of the device and enlarges the device. Further, the calibration has to be influenced by a detection accuracy of another sensor. Thus, the device has to be improved in several respects.

DISCLOSURE OF THE INVENTION

In order to solve the foregoing technical problems, it is an object of this invention to provide a system for controlling a stability factor to control a driving force in a manner to improve a cornering performance of the vehicle.

The present invention is applied to a driving force control system for a vehicle, which is configured to control a driving force of a vehicle by calculating an actual value of a stability factor of a running vehicle based on a detection value of a predetermined sensor, and adjusting the calculated actual value of the stability factor toward a target value of the stability factor determined depending on a travelling condition of the vehicle. In order to achieve the above-explained objective, according to the present invention, the driving force control system is provided with: a steering judging means that judges a fact that a change rate of a steering angle of the vehicle is smaller than a predetermined reference value; a correction value calculating means that corrects the actual value of the stability factor based on a comparison between an actual value and a target value of a physical amount with respect to a turning motion of the vehicle, in case the steering judging means judges that the change rate of the steering angle is smaller than a reference value; and a driving force correcting means that corrects the driving force based on a difference between the corrected actual value of the stability factor and a target value of the stability factor.

According to the present invention, the actual value of the physical amount includes an actual stability factor calculated based on a detection value of the sensor.

The correction value calculating means includes a means configured to correct the actual value of the stability factor based on a difference between the actual stability factor and a target value of the stability factor, in case the steering judging means judges that the change rate of the steering angle is smaller than the reference value.

The aforementioned sensor includes a yaw rate sensor for detecting a yaw rate of the vehicle.

According to another aspect of the present invention, a detection value of the yaw rate sensor is used as the actual value of the physical amount. In this case, the target value of the physical amount is a target value of the yaw rate calculated based on the target value of the stability factor of the case in which the steering judging means judges that the change rate of the steering angle is smaller than the reference value. In addition, the correction value calculating means corrects the actual value of the stability factor by calculating a stability factor based on a corrected yaw rate obtained by correcting the detection value of the yaw rate sensor by comparing the detection value of the yaw rate sensor with the target value of the yaw rate.

According to still another aspect of the present invention, the driving force control system is further provided with a steering angle judging means that judges whether or not an absolute value of a steering angle of the vehicle is smaller than a predetermined reference angle. In this case, a yaw rate sensor is used to detect a yaw rate of the vehicle, and a detection value of the yaw rate sensor, and an actual value of the stability factor calculated based on the detection value of the yaw rate sensor are employed as the actual value of the physical amount. Meanwhile, a target value of the stability factor of the case in which the steering judging means judges that the change rate of the steering angle is smaller than the reference value, and a target value of the yaw rate calculated based on the target value of the stability factor are employed as the target value of the physical amount. According to still another aspect of the present invention, in case the steering angle judging means judges that the steering angle is larger than the reference angle, the actual value of the stability factor is corrected based on a difference between the actual stability factor and the target value of the stability factor of the case in which the steering judging means judges that the change rate of the steering angle is smaller than the reference value. Meanwhile, in case the steering angle judging means judges that the steering angle is smaller than the reference angle, the actual value of the stability factor is corrected by calculating a stability factor based on a corrected yaw rate obtained by correcting the detection value of the yaw rate sensor by comparing the detection value of the yaw rate sensor with the target value of the yaw rate.

In addition, according to the present invention, the correction value calculating means includes a means configured to hold a prior value of the correction value in case the steering judging means judges that the change rate of the steering angle of the vehicle is larger than the reference value; and the driving force correcting means includes a means configured to correct the driving force based on the correction value being held.

Thus, according to the present invention, a travelling condition in which the change rate of the steering angle is smaller than the reference value, more specifically, a travelling condition in which the steering angle is not being changed significantly so that the vehicle is travelling in a substantially straight line or along an arc with a constant turning radius is used as the reference condition, and the actual value is corrected to conform to the target value under the reference condition. Specifically, the correction value is calculated based on a comparison result between the current actual value and the target value, and the driving force is corrected based on the correction value. Consequently, when the vehicle is travelling in a straight line or along an arc with a constant turning radius, the corrected value of the detection value of the sensor and the actual stability factor calculated based on the detection value conform to the target value. In this situation, therefore, a correction of the driving force will not be carried out. In contrast, if the steering angle is being changed, the detection value of the sensor and the actual value of the stability factor are corrected, and the driving force is corrected in accordance therewith. As a result, when the steering angle is being changed so that the vehicle is yawing, the driving force is corrected in a manner such that the turning condition of the vehicle, that is, the stability factor is approximated to the target value. According to the present invention, therefore, a cornering performance of the vehicle is improved. However, the driving force will not be corrected when the vehicle is travelling in a straight line or along an arc with a constant turning radius. That is, the driving force is corrected only when the steering angle is changed. Therefore, the driver will not feel any unintentional change in the driving force so that the driving comfort is improved.

As described, according to the present invention, the travelling condition in which the steering angle is not being changed significantly so that the vehicle is travelling in a substantially straight line or along an arc with a constant turning radius is the reference condition to carry out the correction. Therefore, it is not necessary to correct the zero point of the sensor such as the yaw rate sensor. That is an additional sensor for detecting an orientation and a position of the vehicle is not required. For this reason, a structure of the control system can be simplified.

BEST MODE FOR CARRYING OUT THE INVENTION

The present invention relates generally to a system for controlling a driving force to improve a cornering performance of the vehicle. More specifically, the present invention relates to a system for controlling a driving force in a manner to conform the stability factor obtained based on a detection value of a sensor to a predetermined target value. However, a zero point of the sensor may be varied due to a change in temperature or as time advances. In this case, accuracy of a detection value of the sensor may be degraded to represent the actual condition of the vehicle. Consequently, the actual stability factor may be diverged from the actual condition of the vehicle. In order to correct such error or divergence to conform the stability factor to the target value as close as possible, the driving force control system of the present invention is configured to correct the driving force.

The present invention is applied to a vehicle in which the driving force can be controlled independently from an operation of the driver. For example, any of an internal combustion engine, a motor, a combination of any of the engine and the motor with an automatic transmission, a hybrid drive unit as a combination of the engine and the motor etc. may be used as a prime mover of the vehicle of this kind. In the vehicle of this kind, the driving force may also be controlled by controlling a braking force applied to wheels.

Figure 7:
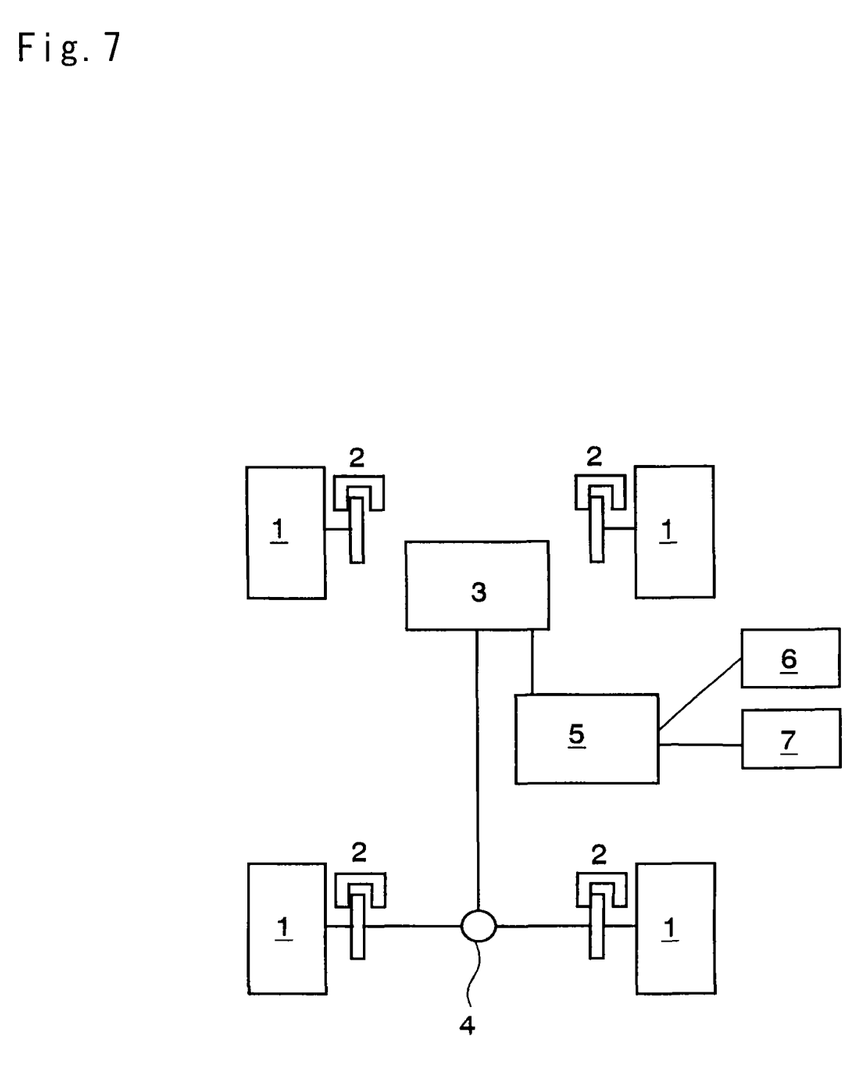
FIG. 7 is a view schematically illustrating a power train and a control line of the vehicle to which the present invention is applied.

FIG. 7 is a block diagram showing a preferred example of a system of the rear-drive vehicle to which the present invention is applied. As shown in FIG. 7, each front and rear wheels 1 is individually provided with a brake 2. For example, those brakes 2 are controlled by conventional systems such as an anti-lock brake system (ABS), a vehicle safety control system (VSC). Therefore, when the driving force is excessive, or when an excessive braking force is applied to the wheels, the braking force is increased or decreased irrespective of a pedal operation of the driver.

The prime mover 3 such as the engine, motor and so on is connected to the rear wheels 1 through a differential 4, and the driving force is controlled by changing an output of the engine or the motor serving as the prime mover 3, or changing a speed ratio. In order to control the driving force, the vehicle is provided with a control system (or controller) 5. The controller 5 is composed mainly of a microcomputer configured to process input data using preinstalled data and programs, and to send processed data in the form of a control command signal to the prime mover 3. For example, detection signals of a steering angle sensor 6 and a yaw rate sensor 7 are inputted to the controller 5. Here, those sensors 6 and 7 are conventional elements of the vehicle forming the vehicle safety control system and so on.

The control system of the present invention is adapted to control the driving force in a manner such that the stability factor conform to the target value as close as possible. Specifically, the stability factor is a physical amount obtained based on a wheelbase of vehicle, a steering angle, a vehicle speed, a yaw rate, a stiffness of tire and etc. That is, the stability factor is an index representing a turning characteristic of the vehicle. Basically, the stability factor is understood as a value representing a turning characteristic of a vehicle traveling along an arc with a constant turning radius. However, as has been taught by prior art documents, the stability factor may also be modified to represent a turning characteristic of a vehicle which is turning while being accelerated or decelerated.

An actual value of the stability factor is determined based on an actual vehicle behavior. That is, the stability factor is calculated based on detection values of sensors. However, the detection values of sensors may be deviated away from an actual behavior of the vehicle due to a temporal change in the temperature characteristic of the sensors or the like. In this case, the actual stability factor will not represent an actual turning condition of the vehicle accurately. Therefore, the control system of the present invention is adapted to correct the driving force while correcting such an error or divergence.

Figure 1:
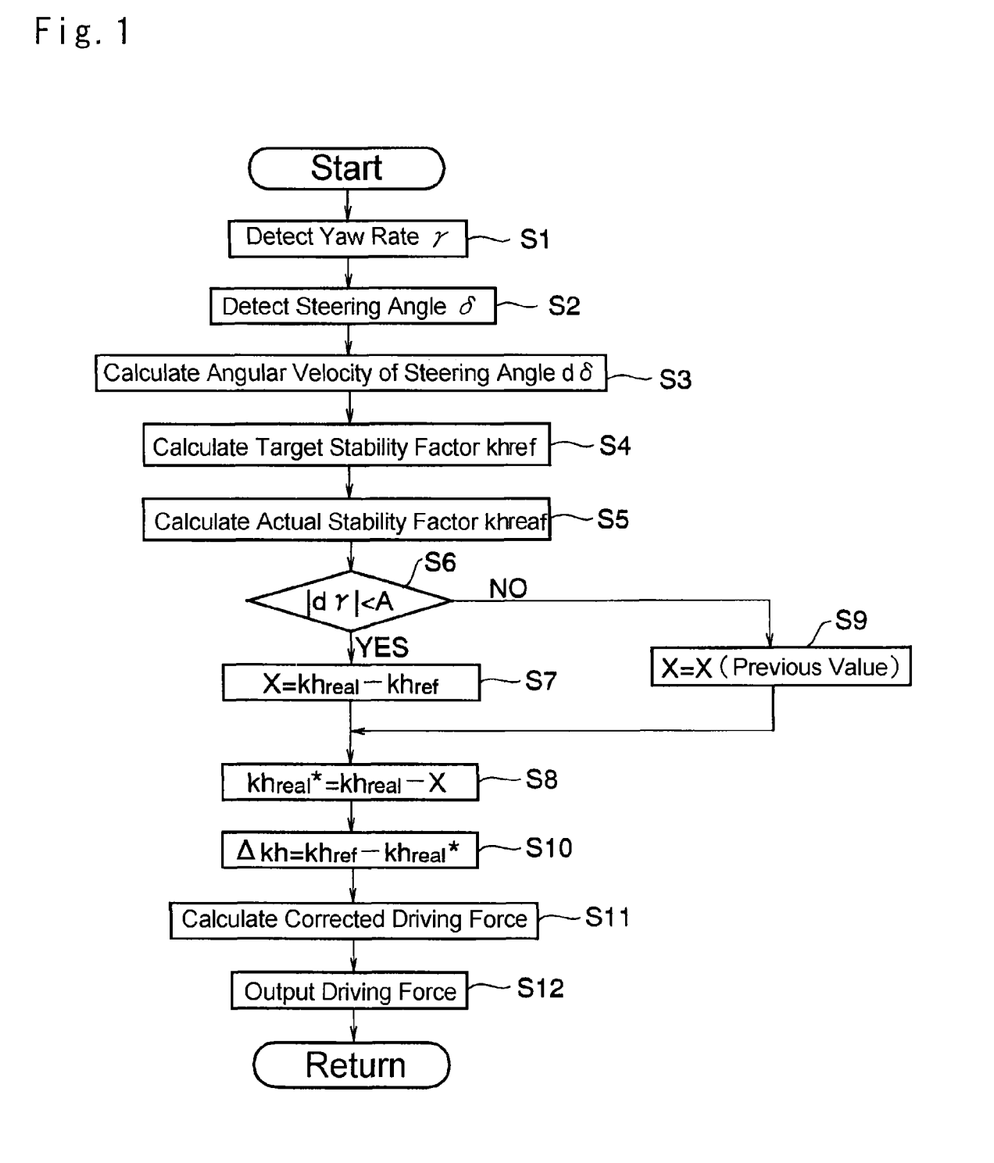
FIG. 1 is a flowchart showing one example of the control carried out by the control system of the present invention.

FIG. 1 is a flowchart showing a preferred control example, and the control shown therein is repeated in a predetermined short cycle.

The control shown in FIG. 1 is an example of correcting the stability factor and the driving force of the case in which a steering angle is substantially kept to a constant angle, that is, the vehicle is traveling in a steady condition. First of all, in order to grasp an actual behavior of the vehicle and a condition of the sensor, a yaw rate $\gamma$ as a detection value of the yaw rate sensor 7, and a steering angle $\delta$ as a detection value of the steering angle sensor 6 are detected (i.e., inputted) (at steps S1 and S2). Here, it is not necessary to carry out those steps in particular order, and it is also possible to carry out those steps simultaneously.

Then, a change rate of the steering angle $\delta$ is obtained. Specifically, an angular velocity of the steering angle $d\delta$ is calculated (at step S3). Thereafter, a target stability factor $kh_{ref}$, and an actual stability factor $kh_{real}$ are calculated (at steps S4 and S5). The target stability factor $kh_{ref}$ is a factor governing a turning characteristic of the vehicle, and the target stability factor $kh_{ref}$ is determined according to a model and grade of the vehicle in the form of a map using the yaw rate $\gamma$ and the steering angle $\delta$ as parameters. Accordingly, at step S4, the target stability factor $kh_{ref}$ is determined with reference to the map.

As described, the target stability factor is a physical amount obtained based on a wheelbase of vehicle, a steering angle, a vehicle speed, a yaw rate, a stiffness of tire and etc. Accordingly, the actual stability factor $kh_{real}$ may be obtained using the following formula:

$$Kh_{real}=[\delta/(n \cdot L \cdot V \cdot \gamma_{real})]-1/V^2$$

where "n" is a steering gear ratio, "L" is a wheel base, "V" is a vehicle speed, and "$\gamma$ real" is a detection value of the yaw rate sensor.

Then, it is judged whether or not the vehicle is travelling in the steady condition. Specifically, it is judged whether or not an absolute value of the change rate of the steering angle $\delta$ (i.e., a steering angular velocity $d\delta$) is smaller than a reference value (i.e., a judging constant) A (at step S6). A running condition of the vehicle is affected by a road condition. Therefore, if the road is inclined or uneven, or if diameters of all of the tires do not coincide with one another, the steering angle $\delta$ may be changed slightly even if the vehicle is running straight ahead or running along an arc with a constant turning radius. That is, the reference value A is a criterion for determining a range of the change in the steering angle. If the change rate $d\delta$ of the steering angle $\delta$ is within the range thus determined, the vehicle is regarded as travailing in a straight line or along an arc with a constant turning radius. To this end, the reference value A is determined based on a result of an experiment or a simulation.

If the vehicle is travelling in a straight line or along an arc with a constant turning radius so that the change rate $d\delta$ of the steering angle $\delta$ is smaller than the reference value A, that is, if the answer of step S6 is YES, a correction value X of the actual stability factor $kh_{real}$ is calculated (at step S7). At step S7, specifically, the actual stability factor $kh_{real}$ is corrected based on a comparison result between: the target stability factor $kh_{ref}$ for the vehicle traveling steadily under a condition in which the change rate $d\delta$ of the steering angle $\delta$ is smaller than the reference value A; and the actual stability factor $kh_{real}$ calculated based on a detection value of the sensor. That is, correction value X is a difference between the target stability factor $kh_{ref}$ for the vehicle traveling under the steady condition and the actual stability factor $kh_{real}$, as expressed by the following expression:

$$X=kh_{real}-kh_{ref}$$

Figure 2:
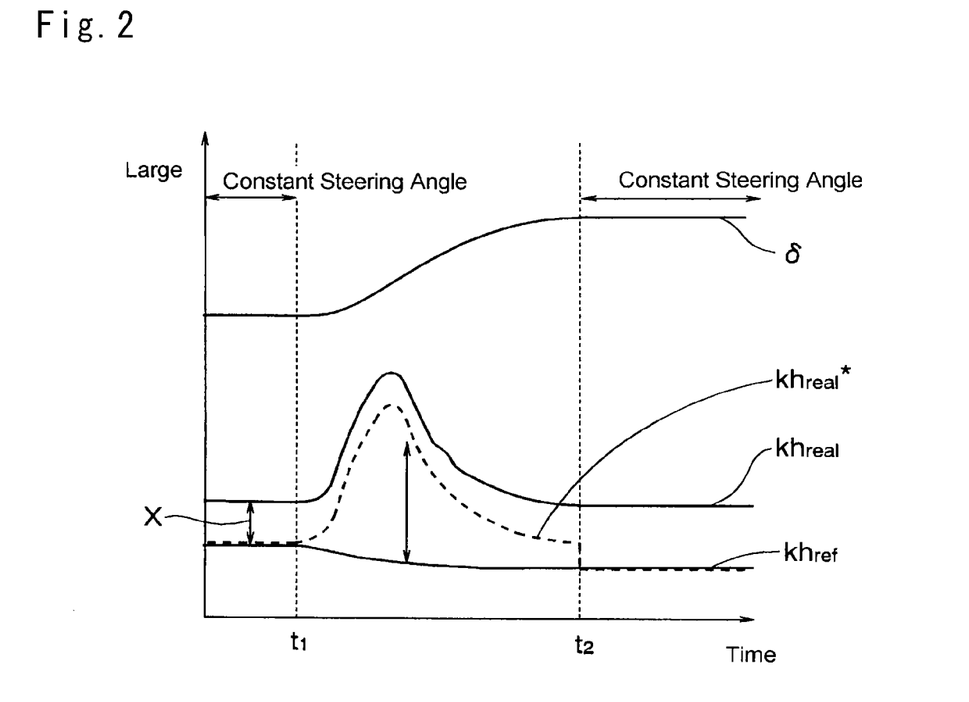
FIG. 2 is a time chart indicating an example of changes in the steering angle, actual stability factor, corrected actual stability factor, and target stability factor when carrying out the control shown in FIG. 1.

Referring now to FIG. 2, FIG. 2 is a time chart indicating changes in the steering angle δ, the actual stability factor $kh_{real}$ and the target stability factor $kh_{ref}$. In the example shown in FIG. 2, the steering angle δ being held at a constant angle is changed at a predetermined change rate dδ, and then held at a constant angle. As can be seen from FIG. 2, a predetermined deviation is caused between the actual stability factor $kh_{real}$ and the target stability factor $kh_{ref}$ even before the time point t1 and after the time point t2, that is, even during a period when the steering angle δ is being kept to a constant angle. This deviation is the aforementioned correction value X. In the example shown in FIG. 2, the correction value X is derived from a fact that the actual stability factor $kh_{real}$ is larger than the target stability factor $kh_{ref}$.

In the example shown in FIG. 2, the deviation between the actual stability factor $kh_{real}$ and the target stability factor $kh_{ref}$ is widened when the steering angle δ is being changed (that is, during the period from t1 to t2) by the following reasons. When the steering angle δ is changed by rotating a (not shown) steering wheel, the running vehicle is started to be turned, or a turning angle of the vehicle is changed. In this situation, however, a change in a yaw is temporally delayed behind a change in the steering angle δ. That is, the detection value of the yaw rate γ detected by the yaw rate sensor 7 will not be changed in this situation in spite of the fact that the steering angle δ as the detection value of the steering angle sensor 6 is changed. Consequently, as can be seen from the above-explained formula, a value of the actual stability factor $kh_{real}$ is increased transitionally. This means that the vehicle is in a strong understeering condition in this situation.

The control system of the present invention is configured to correct the actual stability factor $kh_{real}$ using the correction value X thereby reducing a deviation between the actual stability factor $kh_{real}$ and the target stability factor $kh_{ref}$ as close as possible when the steering wheel is turned. To this end, a corrected actual stability factor $kh_{real}'$ is calculated (at step S8) by subtracting the correction value X from the actual stability factor $kh_{real}$ calculated based on the detection value of the sensor, as expressed by the following equation:

$$kh_{real}' = kh_{real} - X.$$

To the contrary, if the change rate dδ of the steering angle δ is larger than the reference value A so that the answer of step S6 is NO, that is, if the steering wheel is turned, the correction value X calculated previously is held (at step S9) and the routine advances to step S8. Thus, if the steering angle δ is being changed, the corrected actual stability factor $kh_{real}'$ is calculated using the correction value X calculated previously under the previous condition that the vehicle is travelling steadily (that is, calculated under the reference condition).

As described, the correction value X is a difference between the actual stability factor $kh_{real}$ and the target stability factor $kh_{real}$ under the condition that the change rate dδ of the steering angle δ is smaller than the reference value A. Therefore, when the vehicle is travelling under the steady condition, the corrected actual stability factor $kh_{real}'$ coincides with the target stability factor $kh_{ref}$. In contrast, when the steering wheel is being turned so that the steering angle δ is being changed at the angular velocity higher than the reference value A, the corrected actual stability factor $kh_{real}'$ is approximated to the target stability factor $kh_{ref}$ in the amount of the correction value X. The corrected actual stability factor $kh_{real}'$ thus corrected is indicated by the broken line in FIG. 2.

Thus, the corrected actual stability factor $kh_{real}'$ is calculated without taking into consideration detection errors of the sensors resulting from displacement of zero point etc. In this control, therefore, the corrected actual stability factor $kh_{real}'$ is used as the actual value of the stability factor. Therefore, in order to obtain a correction amount of the driving force, the control system of the present invention calculates a correction value of the stability factor Δkh. Specifically, the correction value of the stability factor Δkh is calculated by subtracting the actual stability factor from the target stability factor (at step S10), as expressed by the following equation:

$$\Delta kh = kh_{ref} - kh_{real}'.$$

Specifically, the above expression may be reformed into the following expression:

$$\Delta kh = kh_{ref} - kh_{real}' = kh_{ref} - [kh_{real} - (kh_{real}0 - kh_{ref}0)]$$
$$= (kh_{ref} - kh_{ref}0) - (kh_{real} - kh_{real}0)$$

where $kh_{ref}0$ is the target stability factor $kh_{ref}$ of the case in which the steering angle δ is being held, and $kh_{real}0$ is the actual stability factor $kh_{real}$ of the case in which the steering angle δ is being held. The right side member ($kh_{real} - kh_{real}0$) is determined based on the detection value of the sensor. However, provided that the detection values of the sensors contain detection errors resulting from a displacement of the zero point or the like, the stability factor under the condition that the steering angle δ is being held and the stability factor under the condition that the steering angle δ is being changed are calculated under the equal condition, that is, both values contain a common error. As a result of thus subtracting the actual stability factor from the target stability factor, the errors contained in those values will cancel each other out so that the effect of the errors on the control will be eliminated. Therefore, the driving force can be corrected accurately without being affected by the detection error of the sensor resulting from a displacement of the zero point or the like.

Then, a corrected driving force is calculated based on the correction value Δkh (at step S11), and a command signal to achieve the corrected driving force is outputted (at step S12). For this purpose, the corrected driving force may be calculated by a conventional method. For example, the stability factor may be applied to a condition in which the vehicle is turned while accelerating or decelerating. Accordingly, the driving force or the correction value thereof may be calculated by calculating a longitudinal acceleration using a relational expression determining a relation between the longitudinal acceleration and the stability factor, while taking into consideration a vehicle mass. Here, if the vehicle is provided with a transmission, the command signal may be adapted not only to adjust the output of the engine or motor but also to adjust a speed ratio of a transmission to correct the driving force. Thus, the driving force generated by an accelerator operation of the driver is adjusted by the command signal.

Figure 3:
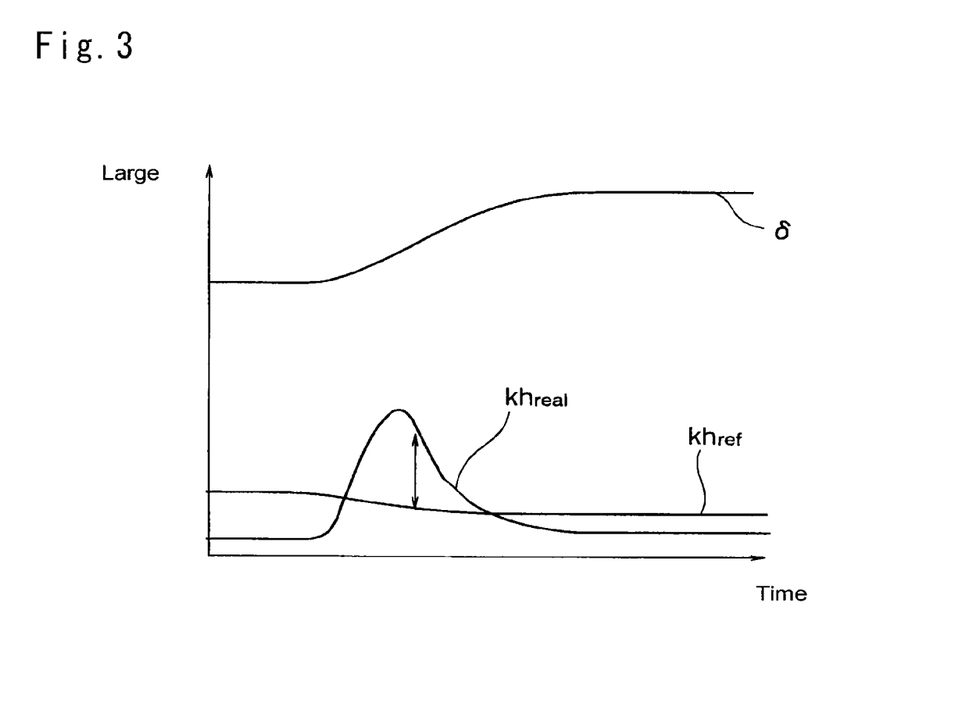
FIG. 3 is a time chart indicating an example of changes in the steering angle, actual stability factor, corrected actual stability factor, and target stability factor when carrying out the control of comparative example.

FIG. 3 shows a comparison example of the case in which the detection value of the sensor has an error and the actual stability factor $kh_{real}$ shown in FIG. 2 is therefore reduced. In the example shown in FIG. 3, the actual stability factor $kh_{real}$ obtained based on a detection value of the sensor is small so that the vehicle is in an oversteering condition in this situation. Consequently, the actual stability factor $kh_{real}$ falls below the target stability factor $kh_{ref}$ during the period when the steering angle δ is being kept to a constant angle. In this situation, the cornering characteristic of the vehicle is regarded as the oversteering condition. In an extreme case, the cornering characteristic of the vehicle may be regarded as the oversteering condition in comparison with the target value if the change rate dδ of the steering angle δ is small, and regarded as the understeering condition in comparison with the target value if the change rate dδ of the steering angle δ is large. In this case, if the driving force is corrected based on such a judgment, a steering characteristic may be varied to deteriorate an easiness of driving the vehicle.

However, the actual stability factor is corrected into the corrected actual stability factor $kh_{real}'$ as indicated by the broken line in FIG. 2. That is, as indicated in FIG. 2, the actual stability factor will not be corrected erroneously to the value to bring the vehicle into the oversteering condition under the situation that the vehicle is in the understeering condition.

Thus, according to the forgoing preferred example of the control system of the present invention, the correction value is determined based on the steady traveling condition, e.g., in which the steering angle δ is not being changed significantly so that the vehicle is travelling in a straight line, or in which the vehicle is travelling along an arc with a constant turning radius. Therefore, the stability factor will follow the target stability factor even during a transient condition in which the steering wheel is being turned so that the yaw rate is changed. In other words, the vehicle is allowed to turn along with the target cornering condition. Therefore, the cornering performance of the vehicle is improved. Since the driving force is thus corrected based on the steady travelling condition, the driving force will not be corrected to change the cornering characteristic of the vehicle under the steady travelling condition. Therefore, the driver will not feel any unintentional change in the driving force so that the driving comfort is improved. More specifically, the driving force is corrected based on the steady travelling condition without correcting a detection error resulting from a displacement of the zero point of the sensor or the like. Therefore, in addition to the above-mentioned advantages, it is not necessary to develop or use a high-precision sensor. For this reason, a cost of the control system can be reduced.

As described, the actual stability factor $kh_{real}$ is calculated based on the yaw rate of the vehicle, however, the yaw rate is a member of denominator in the formula. Therefore, when the yaw rate is not being changed, that is, when the vehicle is travelling in a straight line, the actual stability factor $kh_{real}$ may not be obtained by a calculation. However, the control system of the present invention may be modified to improve the cornering performance of the vehicle by correcting the actual stability factor $kh_{real}$ to correct the driving force even when the vehicle is travelling in a straight line. An example will be explained hereinafter.

Figure 4:
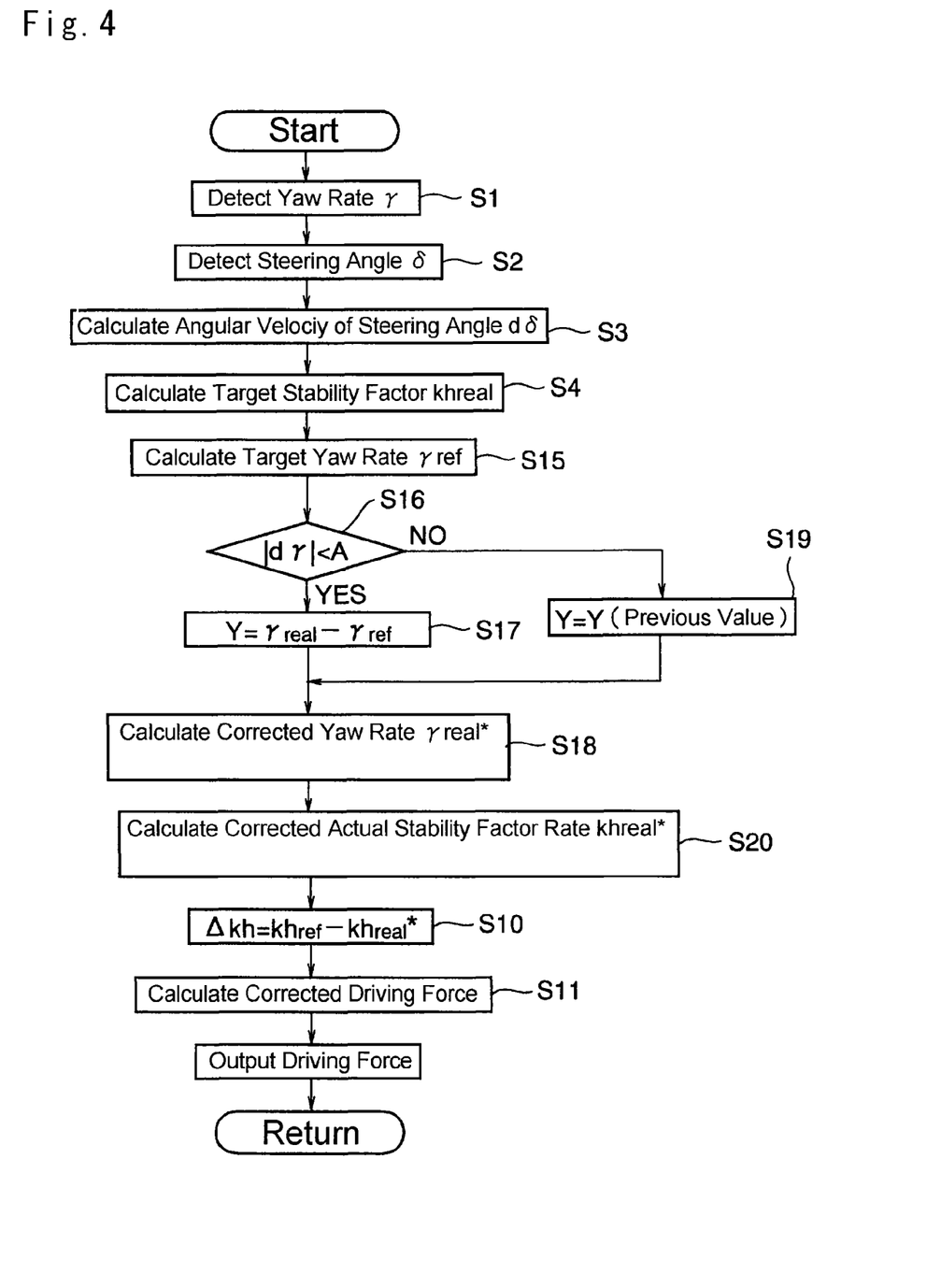
FIG. 4 is a flowchart showing another example of the control carried out by the control system of the present invention.

FIG. 4 is a flowchart showing another example of the control carried out by the driving force control system of the present invention, and the routing shown therein is repeated in a predetermined short cycle. As the example shown in FIG. 1, first of all, a yaw rate γ and a steering angle δ are detected (at steps S1 and S2), and the change rate dδ of the steering angle δ and the target stability factor $kh_{ref}$ are calculated (at steps S3 and S4). As described, the control example shown in FIG. 1 is configured to correct the actual stability factor $kh_{real}$ based on the comparison between the actual value and the target value of the stability factor under the steady travelling condition. Meanwhile, the control example shown in FIG. 4 is configured to obtain the target yaw rate $γ_{ref}$ based on the actual stability factor $kh_{real}$, and the corrected actual stability factor $kh_{real}'$ is obtained based on the target yaw rate $γ_{ref}$. Accordingly, after step S4, the target yaw rate $γ_{ref}$ is calculated (at step S15). At this step, the target yaw rate $γ_{ref}$ is calculated using the formula as a modification of the formula for calculating the actual stability factor $kh_{real}$ used in the example shown in FIG. 1. Specifically, the target yaw rate $γ_{ref}$ is calculated using the following formula:

$$γ_{ref}=V·δ/[(1+Kh_{ref})·V^2·n·L].$$

Then, it is judged whether or not the vehicle is travelling in a steady condition. Specifically, it is judged whether or not an absolute value of the change rate of the steering angle δ (i.e., a steering angular velocity dδ) is smaller than a reference value (i.e., a judging constant) A (at step S16). That is, the control identical to step S6 in FIG. 1 is carried out. If the vehicle is travelling in a straight line or along an arc with a constant turning radius so that the change rate dδ of the steering angle δ is smaller than the reference value A, that is, if the answer of step S16 is YES, a correction value Y of the yaw rate is calculated (at step S17). Specifically, the yaw rate correction value Y is calculated by comparing the actual yaw rate $γ_{real}$ detected by the yaw rate sensor 7 with the target yaw rate $γ_{ref}$ calculated at step S15, as expressed by the following equation:

$$Y=γ_{real}-γ_{ref}.$$

Thereafter, a corrected yaw rate $γ_{real}'$ is obtained by correcting the actual yaw rate $γ_{real}$ detected by the yaw rate sensor 7 using the yaw rate correction value Y (at step S18). Specifically, the corrected yaw rate $γ_{real}'$ is calculated by subtracting the yaw rate correction value Y from the actual yaw rate $γ_{real}$ as a sensor value, as expressed by the following equation:

$$γ_{real}'=γ_{real}-Y.$$

To the contrary, if the change rate dδ of the steering angle δ is larger than the reference value A so that the answer of step S16 is NO, that is, if the steering wheel is being turned, the correction value Y calculated previously is held (at step S19) and the routine advances to step S18. Thus, if the steering angle δ is being changed, the corrected yaw rate $γ_{real}'$ is calculated using the correction value Y calculated previously under the previous condition that the vehicle is travelling steadily (that is, calculated under the reference condition).

Then, the corrected actual stability factor $kh_{real}'$ is calculated by correcting the actual value of the stability factor based on the corrected yaw rate $γ_{real}'$ thus calculated (at step S20). The relation between the stability factor and the yaw rate is as described. Accordingly, the corrected actual stability factor $kh_{real}'$ may be obtained using the following formula:

$$Kh_{real}'=[δ/(n·L·V·γ_{real}')]-1/V^2.$$

As described, the corrected yaw rate $γ_{real}'$ is a value obtained by correcting the actual yaw rate detected by the yaw rate sensor 7 to the value to be detected under the steady travelling condition. Accordingly, the corrected actual stability factor $kh_{real}'$ calculated based on the corrected yaw rate $γ_{real}'$ will be adjusted to the value to be detected under the steady travelling condition. In other words, the detection error of the yaw rate sensor 7 and the error of the stability factor resulting from the detection error will be corrected based on the steady travelling condition.

As the control shown in FIG. 1, after step S20, a difference between the target stability factor $kh_{ref}$ and the corrected actual stability factor $kh_{real}'$ is calculated (at step S10). Then, the correction amount of the driving force (i.e., a corrected driving force) is calculated based on the calculation result (at step S11), and the command signal to achieve the corrected driving force is outputted (at step S12).

Figure 5:
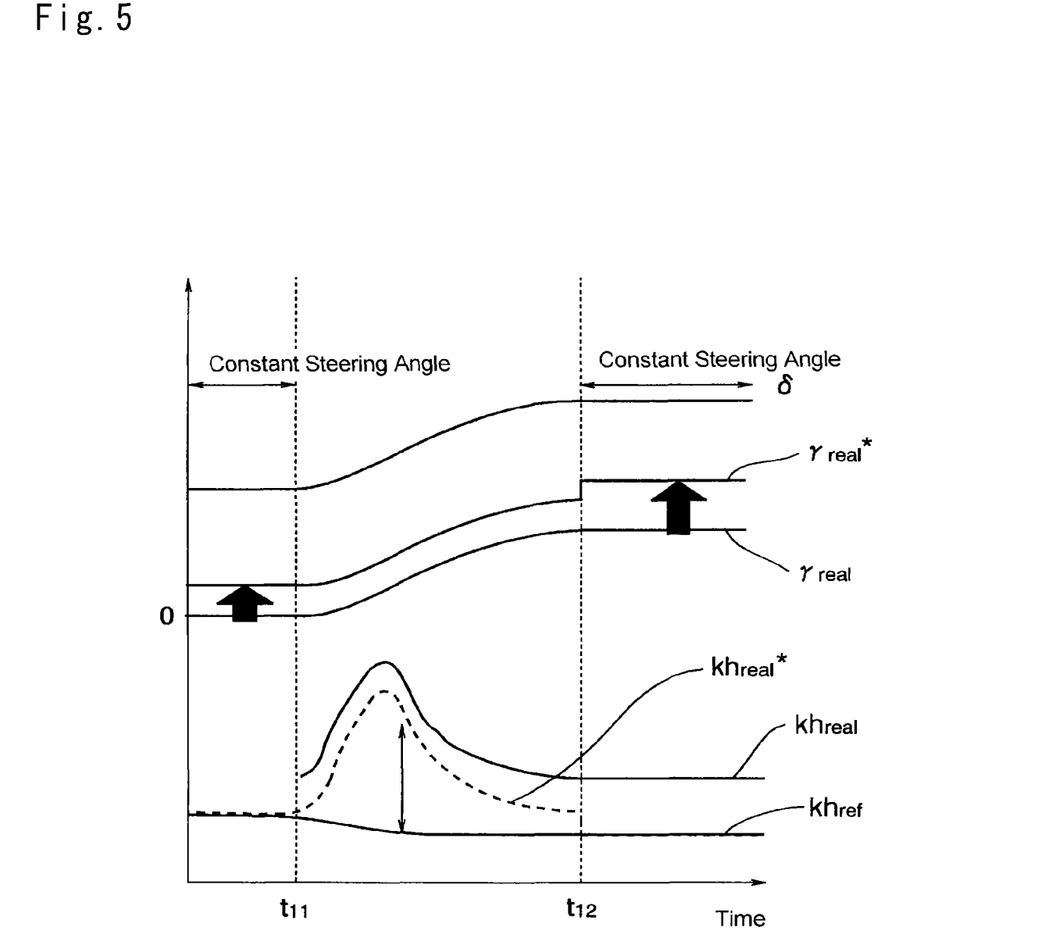
FIG. 5 is a time chart indicating an example of changes in the steering angle, actual stability factor, corrected actual stability factor, and target stability factor when carrying out the control shown in FIG. 4.

FIG. 5 shows changes in the steering angle δ, the actual yaw rate $γ_{real}$ as a detection value of the yaw rate sensor, the corrected yaw rate $γ_{real}'$, the target stability factor $kh_{ref}$, the actual stability factor $kh_{real}$ and the corrected actual stability factor $kh_{real}'$ under the control shown in FIG. 4. In the example shown in FIG. 5, the vehicle travels in a straight line until the time point t11. Then, the steering wheel is turned so that the steering angle δ is changed, and kept to a substantially constant angle again from the time point t12, that is, the vehicle is returned to the steady traveling condition. That is, the vehicle travels in a straight line so that a yaw is not generated until the time point t1. In this situation, therefore, the detection value γ is substantially zero. However, in the vehicle, a predetermined target stability factor $kh_{ref}$ is determined based on the vehicle speed, a detection value of the steering angle sensor 6 and so on. Therefore, the yaw rate is increased to a predetermined value larger than zero in accordance with the target stability factor $kh_{ref}$ (i.e., to the corrected yaw rate $\gamma_{real}'$). In such a steady travelling condition, the stability factor calculated based on the corrected yaw rate $\gamma_{real}'$ conforms to the target stability factor $kh_{ref}$.

As described, the yaw generated in the vehicle is delayed relatively during the period from t11 to t12 in which the steering wheel is being turned so that the yaw rate is being changed. Therefore, both of the actual yaw rate $\gamma_{real}$ and the corrected yaw rate $\gamma_{real}'$ are increased during the period. In this situation, the stability factor calculated based on the corrected yaw rate $\gamma_{real}'$ (that is, the corrected actual stability factor $kh_{real}'$) is employed instead of the actual yaw rate $\gamma_{real}$ calculated based on the detection value of the yaw rate sensor 7. As indicated by the broken line in FIG. 5, the corrected actual stability factor $kh_{real}'$ stays in the oversteering side of the actual yaw rate $\gamma_{real}$ calculated based on the detection value of the yaw rate sensor 7, in other words, a tendency of the understeering is reduced. Then, after the time point t12, the vehicle is brought into the steady travelling condition again. In this situation, the target stability factor $kh_{ref}$ is calculated based on the current vehicle speed, the steering angle δ and etc., and the corrected actual stability factor $kh_{real}'$ is calculated in accordance with the target stability factor $kh_{ref}$. As a result, the corrected actual stability factor $kh_{real}'$ conforms to the target stability factor $kh_{ref}$.

Thus, according to the example of the control system shown in FIG. 4, the driving force can be corrected by correcting the stability factor even if the detection value of the yaw rate sensor 7 is zero. Therefore, the cornering performance of the vehicle can be improved. In addition, as the case of carrying out the control shown in FIG. 1, the driver will not feel any unintentional change in the driving force so that the driving comfort is improved. Further, the cost of the control system can also be reduced.

As explained with reference to FIGS. 1 and 4, the corrected actual stability factor $kh_{real}'$ as the corrected value of the actual stability factor $kh_{real}$ obtained based on the actual travelling condition of the vehicle can be calculated based on a deviation from the target value under the steady travelling condition, or calculated based on the correction value of the yaw rate. However, an improvement of the cornering performance may be limited depending on the travelling condition of the vehicle. For example, if the detection value of the yaw rate sensor is zero, the actual stability factor cannot be obtained based on the detection value. In addition, since the steering angle is one of the factors of the stability factor, the stability factor may be affected by a detection error of the steering angle sensor depending on the travelling condition. Consequently, the error contained in the corrected actual stability factor $kh_{real}'$ calculated based on the corrected yaw rate $\gamma_{real}'$ may be increased. In this case, the driving force may not be controlled in a manner to improve the cornering performance.

Figure 6:
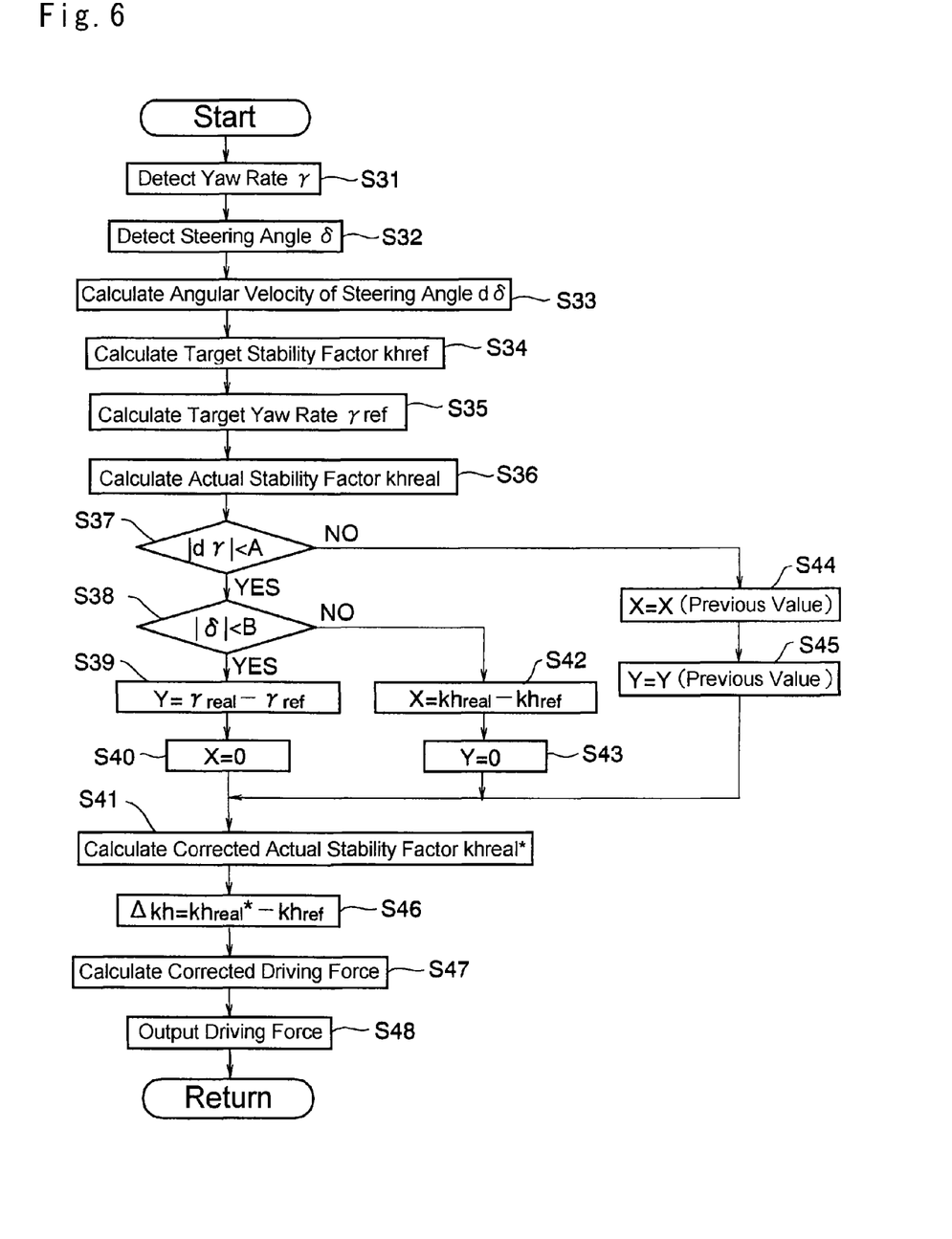
FIG. 6 is a flowchart showing still another example of the control carried out by the control system of the present invention.

The control system of the present invention may be modified to change the control content depending on the travelling condition so as to compensate the limitation or characteristics of the forgoing controls. FIG. 6 is a flowchart showing a control example for changing the control content depending on the steering angle δ under the steady travelling condition. According to the control example shown in FIG. 6, sensor values representing a travelling condition of the vehicle, and physical amounts according to the sensor values and target values thereof are obtained. Specifically, a yaw rate γ and a steering angle δ are detected by the sensors (at steps S31 and S32), and the change rate dδ of the steering angle δ, the target stability factor $kh_{ref}$, the target yaw rate $\gamma_{ref}$ and the actual stability factor $kh_{real}$ are calculated based on the detection values (at steps S33 to S36). The contents of steps S31 to S34 and S36 are identical to those of steps S1 to S5 shown in FIG. 1, and the content of step S35 is identical to that of step S15 shown in FIG. 4.

Then, it is judged whether or not the vehicle is in the steady travelling condition. Specifically, it is judged whether or not an absolute value of the change rate of the steering angle δ (i.e., a steering angular velocity dδ) is smaller than a reference value (i.e., a judging constant) A (at step S37). That is, the control identical to step S6 shown in FIG. 1 and step S16 shown in FIG. 4 is carried out. If the vehicle is under the steady travelling condition so that the answer of step S37 is YES, it is judged whether or not an absolute value of the steering angle δ is smaller than a reference angle B (at step S38). That is, Step S38 is carried out to judge whether or not the vehicle is travelling under the steady condition. Specifically, the reference angle B corresponds to the maximum value of the steering angle δ to be changed under the situation that the vehicle is travelling in a substantially straight line, and the steering angle δ is determined based on a result of an experimentation or simulation.

If the answer of step S38 is YES, that is, if the vehicle is travelling in a straight line, the yaw rate may be substantially zero. In this case, the stability factor may not be calculated based on the detection value of the yaw rate sensor 7. Therefore, the control shown in FIG. 4 is carried out in this case. Specifically, as step S17 shown in FIG. 4, the correction value Y of the yaw rate is calculated (at step S39), as expressed by the following equation:

$$Y = \gamma_{real} - \gamma_{ref}.$$

Then, the correction value X of the actual stability factor $kh_{real}$ is set to zero (at step S40). In other words, reset of the correction value X is carried out. Details of the correction value X will be explained later.

As explained in the explanation of the example shown in FIG. 4, the corrected yaw rate $\gamma_{real}'$ is corrected based on the yaw rate correction value Y, and the corrected actual stability factor $kh_{real}'$ can be calculated based on the corrected yaw rate $\gamma_{real}'$. Therefore, in the control example shown in FIG. 6, the corrected actual stability factor $kh_{real}'$ is also calculated based on the yaw rate correction value Y (at step S41). For example, $kh_{real}'$ be calculated using the following formula:

$$Kh_{real}' = [\delta n \cdot L \cdot V \cdot (\gamma_{real} - Y)] - 1/V^2 - X.$$

Here, the correction value X of the stability factor is used in the above formula. This is because a common formula is also used in the case in which the steering angle δ is larger than the reference angle B, as described below.

If the answer of step S38 is NO, that is, the steering wheel is being turned so that the vehicle is turning, the yaw rate sensor 7 is outputting the detection value larger than zero. In this case, therefore, the control shown in FIG. 1 is carried out. Specifically, as step S7 shown in FIG. 1, the correction value X of the actual stability factor $kh_{real}$ is calculated (at step S42) as expressed by the following expression:

$$X = kh_{real} - kh_{ref}.$$

Then, the correction value Y of the yaw rate is set to zero (at step S43). In other words, reset of the correction value Y is carried out.

As explained in the explanation of the example shown in FIG. 1, the corrected actual stability factor $kh_{real}'$ can be calculated based on the correction value X of the actual stability factor $kh_{real}$. According to the example shown in FIG. 6, therefore, the routine advances from step S43 to S41 to calculate the corrected actual stability factor $kh_{real}'$ using the above-explained formula. In this situation, the correction value Y of the yaw rate has already been set to zero, therefore, the calculation identical to that of the step S8 shown in FIG. 1 is carried out.

In contrast, if the absolute value of the steering angular velocity dδ is increased to be larger than the reference value A by turning the steering wheel so that the answer of step S37 is NO, the above-explained calculations for the correction values X and Y are skipped, and prior values of the correction values X and Y being held are employed (at steps S44 and S45). Then, the corrected actual stability factor $kh_{real}'$ is calculated using those values (at step S41).

Thus, the corrected actual stability factor $kh_{real}'$ is obtained depending on the travelling condition, e.g., the condition in which the vehicle is travelling in a straight line or the steering angle δ of the turning vehicle is kept to a constant angle, and the condition in which the steering angle δ is being changed. Then, as the examples shown in FIGS. 1 and 4, a difference between the target stability factor $kh_{ref}$ and the corrected actual stability factor $kh_{real}'$ is calculated (at step S46), the correction amount of the driving force (i.e., the corrected driving force) is calculated based on the calculation result (at step S47), and the command signal to achieve the corrected driving force is outputted (at step S48). Those steps S46 to S48 are identical to steps S10 to S12 shown in FIGS. 1 and 4.

Thus, according to the control example shown in FIG. 6, the sensor value and the stability factor can be corrected based on the reference condition in which the vehicle is travelling in a straight line or travelling along an arc with a constant turning radius, even if the detection value of the yaw rate sensor 7 has an error resulting from a displacement of zero point etc., and the content of the correction control is changed depending on the travelling condition. Therefore, the stability factor can be adjusted to the target value as close as possible during turning of the vehicle. For this reason, as the control examples shown in FIGS. 1 and 4, the cornering performance of the vehicle can be improved. In addition, the driver will not feel any unintentional change in the driving force under the steady travelling condition so that the driving comfort is improved. Further, the cost of the control system can also be reduced.

Here will be briefly explained a relation between the foregoing examples and the present invention. The functional means carrying out the controls of steps S6, S16 and S37 serve as the steering judging means of the present invention, the functional means carrying out the controls of steps S18, S20, S39, S41, S42 and S46 serve as the correction value calculating means of the present invention, and the functional means carrying out the controls of steps S11, S12, S47 and S48 serve as the driving force correcting means of the present invention.

The invention claimed is:

1. A driving force control system for a vehicle, which is configured to control a driving force of a vehicle by calculating an actual value of a stability factor of a running vehicle based on a detection value of a predetermined sensor, and adjusting the calculated actual value of the stability factor toward a target value of the stability factor determined depending on a travelling condition of the vehicle, comprising:

a steering judging means that judges a fact that a change rate of a steering angle of the vehicle is smaller than a predetermined reference value;

a correction value calculating means that corrects the actual value of the stability factor based on a comparison between an actual value and a target value of a physical amount with respect to a turning motion of the vehicle, in case the steering judging means judges that the change rate of the steering angle is smaller than a reference value;

a driving force correcting means that corrects the driving force based on a difference between the corrected actual value of the stability factor and a target value of the stability factor; and a steering angle judging means that judges whether or not an absolute value of a steering angle of the vehicle is smaller than a predetermined reference angle;

wherein the sensor includes a yaw rate sensor for detecting a yaw rate of the vehicle;

wherein the actual value of the physical amount includes a detection value of the yaw rate sensor, and an actual value of the stability factor calculated based on the detection value of the yaw rate sensor;

wherein the target value of the physical amount includes a target value of the stability factor of the case in which the steering judging means judges that the change rate of the steering angle is smaller than the reference value, and a target value of the yaw rate calculated based on the target value of the stability factor; and wherein the correction value calculating means includes a means configured to correct the actual value of the stability factor based on a difference between the actual stability factor and the target value of the stability factor of the case in which the steering judging means judges that the change rate of the steering angle is smaller than the reference value in case the steering angle judging means judges that the steering angle is larger than the reference angle, and to correct the actual value of the stability factor by calculating a stability factor based on a corrected yaw rate obtained by correcting the detection value of the yaw rate sensor by comparing the detection value of the yaw rate sensor with the target value of the yaw rate in case the steering angle judging means judges that the steering angle is smaller than the reference angle.

2. The driving force control system for a vehicle as claimed in claim 1, wherein the correction value calculating means includes a means configured to hold a prior value of the correction value in case the steering judging means judges that the change rate of the steering angle of the vehicle is larger than the reference value; and wherein the driving force correcting means includes a means configured to correct the driving force based on the correction value being held.

* * * * *